(No Model.)
C. H. BEELER.
FODDER BINDER.
No. 356,976. Patented Feb. 1, 1887.
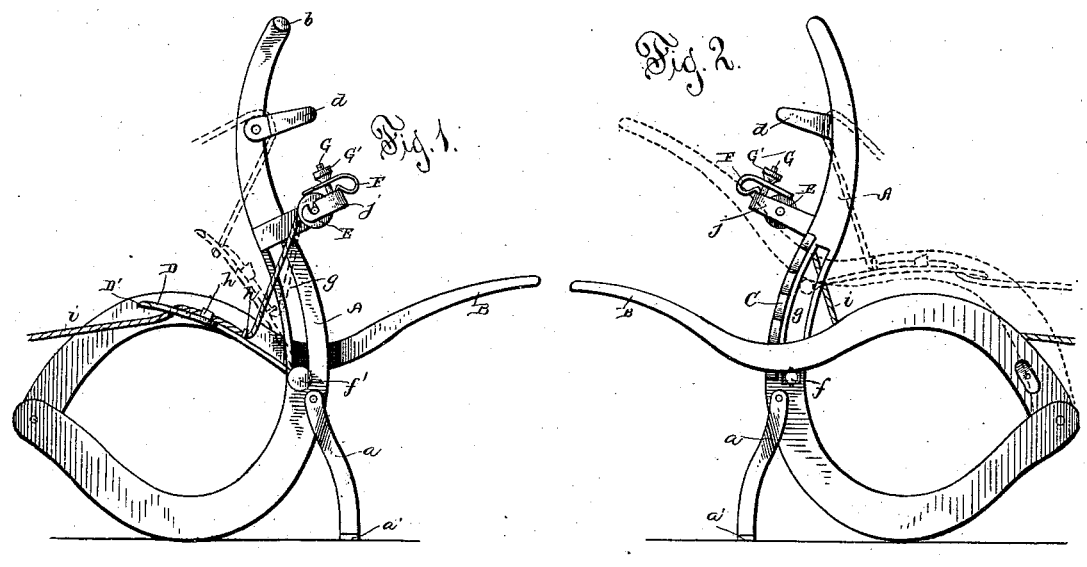
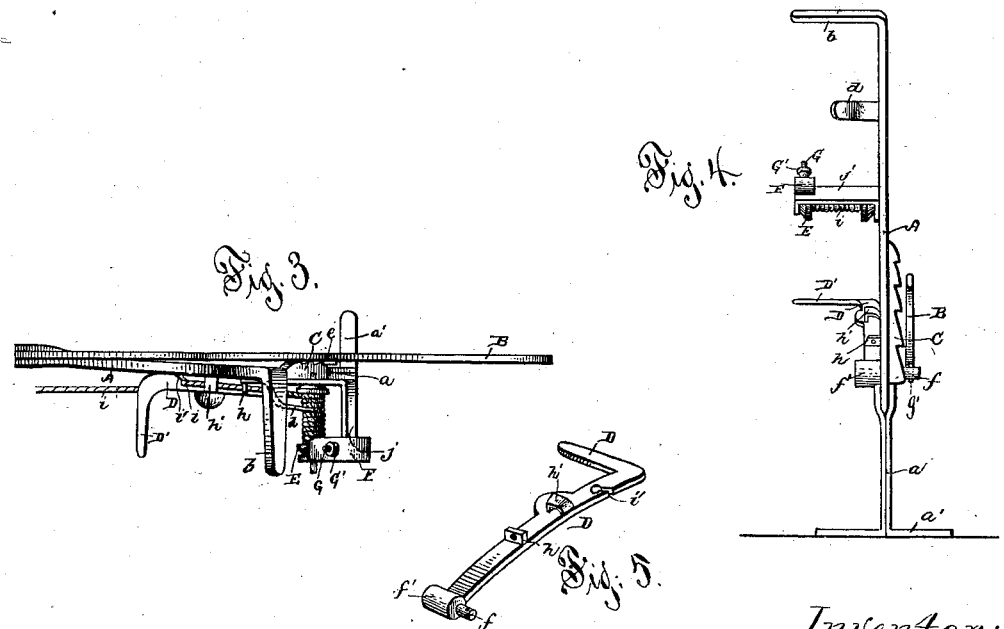
Witnesses:
John Enders Jr.
Inventor:
Charles H. Beeler
By Myers & Co.
Attorneys

UNITED STATES PATENT OFFICE.

CHARLES H. BEELER, OF FREMONT, OHIO.

FODDER-BINDER.

SPECIFICATION forming part of Letters Patent No. 356,976, dated February 1, 1887.

Application filed March 5, 1886. Serial No. 194,120. (No model.)

*To all whom it may concern:*

Be it known that I, CHARLES H. BEELER, a citizen of the United States of America, residing at Fremont, in the county of Sandusky and State of Ohio, have invented certain new and useful Improvements in Fodder-Binders, of which the following is a specification, reference being had therein to the accompanying drawings.
This invention pertains to improvements in cornstalk or fodder binders, having for its object to bind the stalks or fodder compactly and with facility into bundles, as well as to provide for having the binding twine or wire directly at hand, and for convenience in handling the wire or twine and in cutting and tying the same; and the invention consists of the combinations of parts, including their construction, substantially as hereinafter set forth, and pointed out in the claims.

In the accompanying drawings, Figures 1 and 2 are opposite side views of my invention. Fig. 3 is a plan view. Fig. 4 is a front view thereof, and Fig. 5 is a detail view.
In the organization of my invention I employ a curved bar or support, A, which in shape has the general characteristics of the letter J, and is pivoted at about the point of the union of its virtually straight portion and greater or lower curvature to a standard, a. The latter is preferably made of two parts bolted together, with their upper ends just sufficiently separated to receive snugly between them the bar A edgewise, while the lower ends of said parts are bent at right angles to their vertical portions and diametrically opposite to each other, thus forming feet a'. The upper end of the bar A is formed or provided with a laterally-projecting handle, b, and with an arm or bracket, d, a short distance below said handle, the function of which will appear farther on.

B is a curved hand-lever, with its one end pivoted to the lower outer end of the bar A, while at about its mid-length (the point thereof opposite the vertical portion of said bar) it is provided with a tooth, e, which engages with a rack, C, of the bar A. The lever is possessed of sufficient spring to enable it to be sprung out of a direct line with its pivoted end, as it is upon the rack C, whereby its tooth e will be automatically detained or held forcibly in engagement therewith, the purpose of which will be seen hereinafter.

D is a supplementary lever, with its one end provided with a fixed lateral projection or pivot, f, secured in a hub or shoulder, f', on the end of said lever, and said pivot passes through and works in an elongated slot, g, in the bar A, being held therein by a pin, g', inserted transversely through it, said hub or shoulder resting against and holding the lever D out of contact with the bar A. The outer end of the pivot f projects through said slot g and a short distance on one side of the bar A, so as to be in the line of travel of the lever B, the under side of which latter comes in contact with said projecting end of the pivot f. This lever is also provided with a handle, D', at its free end, and upon its upper side with an eye, h, for the passage of the binding twine or wire, and a short distance forward of the latter with a cutter, h', formed of an inverted-L-shaped plate, with the edge nearest the eye h sharpened, while its open side (the overhanging side edge of the base of the L) permits of the convenient or ready insertion thereunder of the binding-twine. Still farther forward the lever D is provided with an oblique binding wire or twine slit, i', extending from its one side edge inward and terminating in an aperture, i', for the reception and passage of the twine or wire.

E is a spool or holder for the binding wire or twine, which is supported in a bracket or frame, j, fixed to the bar A, near its upper end, one of the eyes in said bracket, which receives the shaft or axis of the spool or holder, being open for insertion of the spool or holder and its removal when required to be replenished.

Upon one arm of the bracket or frame j is secured one end of a bent or looped spring, F, which is adapted to exert its pressure upon the spool or holder E to control the unwinding or feeding of the wire or twine therefrom in passing the same around and binding the cornstalks or fodder into bundles. In effecting this result the free end of the spring F is caused to bear upon one flange of the spool or holder E, and through said spring, near said end thereof, is passed a screw, G, having a milled-headed nut, G', and secured upon the frame or bracket j. It is obvious that by working or turning the nut in the required direction more or less the required pressure can be exerted upon the spring in order to vary the pressure of the latter upon the spool or holder, as may be desired.

It will be observed that prior to beginning the binding operation the twine or wire, after having been connected, as above described, to the supplementary lever D, is passed over the arm or bracket d of the bar A, as indicated in dotted lines, Fig. 1, holding the lever in an elevated position out of the way until stalks or fodder have been disposed or placed between the main lever B and bar A. The lever D being thus elevated out of the way and the main lever B extended or swung outward, the stalks or fodder are placed crosswise of and upon the curved part of the bar A, in bulk, according to the receiving capacity of the latter. The lever B is now brought into position and pressed upon the stalks or fodder with the required amount of pressure, the pressure on said lever causing, of course, the sliding downward of the pivot f of the supplementary lever in the slot g, the same having been previously elevated with the lever D, after which, in order to still further compress the stalks or fodder, the supplementary lever is brought into requisition, the twine or wire having been removed from the arm or bracket d of the bar A. Said supplementary lever is also forced or allowed to fall against the stalks or fodder being bound, so as to guide the cord or twine in its application thereto. The twine is now passed in the usual manner around the stalks or fodder of the bundle thus formed, and by catching the twine on each side of the cutter h' the same will be cut by the sharpened edge of said cutter h', after which it is tied by the hands in any desired manner and the bound bundle can be removed and is ready for disposal, as may be required.

If wire is used to bind the bundles in lieu of twine, the former is passed around the bundle and severed by suitable means, when the ends thereof are twisted together, completing the binding of the bundles.

Having thus fully described my invention, what I claim, and desire to secure by Letters Patent, is—

1. In a fodder or cornstalk binder, the combination, with the curved bar having a rack on its vertical or upright portion, and a handle, together with a foot-standard, of the curved lever pivoted to the outer lower end of the curvature of said bar and having a tooth engaging the rack of the latter, substantially as and for the purpose set forth.

2. In a fodder or stalk binder, the combination, with the curved bar or upright having an elongated slot, of the lever pivoted to the lower outer end of the curvature of said bar or upright and adapted to engage with the vertical portion of said bar, and the supplementary lever with its pivot entering and working in said slot of bar or upright, substantially as and for the purpose specified.

3. In a cornstalk or fodder binder, the combination, with the curved bar or upright, of the curved lever pivoted to the lower outer end of the bar or upright, the supplementary lever pivoted to the vertical portion of the upright or bar, and the twine or wire holder or spool supported upon the bar or upright, with the wire or twine therefrom connecting with the supplementary lever for binding the cornstalks or fodder, substantially as set forth.

4. In a fodder or cornstalk binder, the combination, with the curved upright or bar having a bracket or arm near its upper end, of the curved lever pivoted at the lower outer end of said bar or upright and adapted to engage with the vertical portion of said bar or upright, the supplementary lever pivoted to said vertical portion of bar, and the spool or holder having the binding wire or twine passed to the supplementary lever, said bracket or arm being adapted to have the binding twine or wire passed over it, and thus support the supplementary lever in an elevated position out of the way, substantially as shown and described.

5. In a fodder or cornstalk binder, the combination, with the curved bar or upright having an elongated slot in its vertical portion, of the curved lever pivoted to the lower outer end of the curvature of the bar or upright and engaging with said vertical portion of bar or upright, the supplementary lever having its pivot working in said slot of bar or upright, said lever also having an eye, a cutter, and a slit terminating in an aperture, and the wire or twine holder or spool upon the curved bar, with the twine or wire passed through said eye in the supplementary lever under said cutter and through said aperture of the supplementary lever, substantially as shown and described.

6. In a fodder or cornstalk binder, the combination, with the curved bar or upright having a curved lever pivoted thereto, and a supplementary lever having its pivot movable in a slot of the said bar or upright, of the wire or twine holder or spool supported upon a bracket or frame of said bar or upright, and a tension or pressure-regulating spring having an adjusting-screw and nut and bearing upon said spool, substantially as and for the purpose set forth.

7. In a fodder or cornstalk binder, the combination, with the curved bar or upright having a curved lever pivoted thereto, and a supplementary lever having its pivot movable in a slot of the upright or bar and having upon its one side an eye, a cutter, and a slit leading to an aperture, of the wire or twine spool or holder supported upon a frame or bracket, the curved bar with the wire or twine therefrom passed through said eye under said cutter and through said aperture of the supplementary lever, together with a tension-spring mounted upon said frame or bracket, and a bearing at one end upon said spool or holder, said spring being controlled by a screw and nut, substantially as and for the purpose specified.

In testimony whereof I affix my signature in presence of two witnesses.

CHARLES H. BEELER.

Witnesses:
JAMES H. FOWLER,
FRED HEDRICK.